United States Patent [19]

Kearney et al.

[11] Patent Number: 5,391,337
[45] Date of Patent: Feb. 21, 1995

[54] METHOD FOR MAKING EVAPORATIVE CASTING PATTERNS

[75] Inventors: Dolores C. Kearney; Bruno Matz, both of West Bloomfield, Mich.

[73] Assignee: Ford Motor Company, Dearborn, Mich.

[21] Appl. No.: 720,147

[22] Filed: Jun. 24, 1991

[51] Int. Cl.⁶ .......................................... B29C 67/22
[52] U.S. Cl. ..................... 264/51; 264/219; 264/327
[58] Field of Search ............ 264/51, 45.4, 327, 219, 264/DIG. 10, 53

[56] References Cited

U.S. PATENT DOCUMENTS

| | | | |
|---|---|---|---|
| 4,034,952 | 7/1977 | Stewart | 249/105 |
| 4,272,469 | 6/1981 | Smith | 264/53 |
| 4,338,068 | 7/1982 | Suh et al. | 425/144 |
| 4,387,762 | 6/1983 | Rinderle | 425/548 |
| 4,500,279 | 2/1985 | Devellian et al. | 425/548 |
| 4,627,946 | 12/1986 | Crabtree | 264/51 |
| 4,689,004 | 8/1987 | Kunkel | 264/51 |
| 4,781,555 | 11/1988 | Cook | 264/51 |
| 4,995,443 | 2/1991 | Easwaran | 164/34 |
| 5,034,167 | 7/1991 | Masters | 264/51 |

FOREIGN PATENT DOCUMENTS 55-140533  4/1979  Japan .

*Primary Examiner*—Allan R. Kuhns
*Attorney, Agent, or Firm*—Roger L. May; Joseph W. Malleck

[57] ABSTRACT

A method for making expandable foam patterns for use in an evaporative casting process includes assembling a plurality of mold parts of a molding tool having mold walls defining a mold cavity, each mold part having a housing wall separated from the mold wall to form a heat exchange cavity adjacent the mold wall, inserting at least one heat pipe adjacent a mold wall portion, filling the mold cavity formed by the mold parts with expandable foam beads, heating the tool by introducing a fluid heat exchange medium to the heat exchange cavity to heat the cavity for a predetermined time, cooling the tool and separating the mold parts to release the expanded foam pattern.

8 Claims, 1 Drawing Sheet

METHOD FOR MAKING EVAPORATIVE CASTING PATTERNS

TECHNICAL FIELD

The present invention relates generally to methods and tooling for making mold patterns to be used in evaporative casting, and more particularly to the preparation of mold parts for controlling the heat distribution to the mold wall surrounding the mold cavity where the pattern is formed.

BACKGROUND ART

Patterns used in evaporative castings must be precisely made since they define the shape of the part to be made within a sand casting cavity formed by packing the pattern in sand. Such patterns are consumed during the evaporative casting process, and a large number of patterns are required for evaporative casting since each part requires a new pattern. As a result, economies and improvements in the production of the patterns can have a substantial effect upon the cost and quality of the end product produced by the evaporative casting process.

A previously known method for making such patterns comprises assembling a plurality of previously configured mold parts including mold wall surfaces that define the pattern forming chamber. The mold walls are separated apart from housing walls of each mold part to form a heat exchange cavity therebetween. The mold parts also include couplings for connecting the heat exchange cavities with fluid heat exchange such as cold water and hot steam. Assembly of the mold parts forms a pattern making tool.

To prepare expanded foam patterns with such parts, beads are formed from polystyrene or other materials such as polymethyl methacrylate (PMMA) or polyalkylene carbonate (PCA) and a thermal expanding agent such as pentane or the like. The beads, originally about the size of salt grains, are heated in a large container to a temperature of about 215° F. to pre-expand the grains and form beads of a density of about 0.9-1.9 pounds per cubic foot. The pre-expanded pellets are then transferred to fill the mold cavity defined by the mold walls. The pellets are then heated for a limited time depending upon the degree of fusion desired and the composition of the pellets, for example, generally from a fraction of a minute to several minutes, by steam introduced to the heat exchange cavities at a temperature of about 215° F. This heating step will expand, soften, distort and merge the expanded beads together to form a unitary foam pattern shaped by the mold walls. The expansion process is then stopped by running cold water through the heat exchange cavities. After separating the mold parts, the pattern is removed from the mold.

In such a process, temperature variations along the mold wall can have a profound effect upon the quality of the part produced. The degree of expansion of the pellets depends upon the temperature and the time duration at which the temperature is maintained. Accordingly, dimensional stability of the pattern and the surface quality of the pattern are improved when the temperature of the mold cavity surface is consistent throughout the cavity. However, when the mold wall includes recessed wall portions or various wall thicknesses, temperature along the mold surface may be inconsistent throughout the stages of operating the mold. When parts of the mold wall surface are recessed away from the heat exchange chamber, the resistance to heat energy transfer from the heat exchange medium can interfere with consistent heat exchange to the foam beads forming the pattern. Moreover, while thin mold wall portions may be desired for efficient heat transfer, a thicker mold wall portion will absorb more heat to reach the same temperature even though the heat exchange medium contacting it has a substantially constant temperature. Furthermore, a greater amount of heat energy may need to be transferred to a mold wall part which defines a mold wall cavity portion for a relatively thick portion of the pattern to be formed.

The problem of inconsistent mold wall temperatures is particularly acute in molding tools using mold cores since the cores typically do not include heat exchange passages. Accordingly, previous expanded foam patterns may require assembly of two or more expanded foam parts by gluing or the like to complete a single pattern. Such assembly interferes with the integrity of the pattern and the quality of the pattern surfaces.

Moreover, the quality of the pattern formed has a substantial effect upon the part to be cast using the pattern in an evaporative casting process. Improved surface finish and dimensional stability in the pattern can substantially reduce if not eliminate certain machining operations otherwise necessary to satisfy the molded part's required specifications. Each such machining operation which can be eliminated represents a substantial savings in energy, labor and tooling costs which must be incurred in order to produce a finished part after evaporative casting.

In order to overcome the problem of temperature variation, a previously known attempt for improving the pattern casting method included venting the core. In a hollow vented core or mold, vent passageways are provided in the mold wall forming the mold cavity so that the heat exchange chamber is coupled for fluid communication with the mold cavity. The vent typically includes restricted slots to prevent expansion of the foam material into the vent or the heat exchange chamber during molding. Before the foam material is introduced into the cavity, the vent passages permit the heat exchange fluid medium to enter the cavity and contact both sides of the mold wall defining the mold cavity to enhance uniformity of the heat transfer to the molded material. Although such venting provides greater uniformity in temperature throughout the mold cavity, foam material can expand into the slots of the vent passage during the process. The bulges of foam into the vent cause the part to deviate from the part specifications. Furthermore, they cause interference between the foam pattern and the core or mold wall surfaces and cause scoring of the pattern during removal of the core or the pattern from the mold. Such interference can cause substantial damage to the surface finish of the molded foam part and thus, to the cast workpiece formed with the pattern. As a result, a large number of unacceptable patterns are produced by such a method.

Another process for making foam patterns without the difficulties of vented cores or mold walls comprises the use of hollow cores or mold walls through which the heat exchange medium can penetrate into deeply recessed portions of the mold wall. Although such hollow openings permit the heat exchange medium to contact the mold walls, the restrictions to flow caused by dimensional limitations of such channels can cause a substantial variation in temperature between the recessed mold wall and contiguous mold wall portions. Accordingly, the heat exchange medium must remain in the heat exchange cavities for longer periods of time in order to permit the temperature at the bottom of the recess to reach the temperature of the remaining mold wall portions. Such time delays in the pattern forming process can substantially reduce the production output of the foam patterns and thus the output of the evaporative casting process. As a result, the number of tools to produce the patterns must be increased in order to provide a satisfactory production rate. Furthermore, the variation in expansion rates throughout the mold cavity affects the surface consistency and dimensional stability of the pattern.

The inability to uniformly transfer heat has also been recognized in the art of injection molding, where the molten material, usually plastic, is heated before introduction into the mold chamber. In such a process, the material must be heated to a molten state in order to be transferred from its source through delivery conduits and within the mold cavity so that it remains capable of conforming to the mold cavity shape. In order to maintain enough heat in the fluid during transfer between the source and the cavity, U.S. Pat. No. 4,034,952 to Stewart discloses a hot plastic injection bushing surrounded by a heat pipe to maintain all parts of the tubular bore at the same temperature as an externally controlled electrical heater.

U.S. Pat. Nos. 4,338,068 and 4,387,762 disclose a variable volume heat pipe for use in injection molding. U.S. Pat. No. 4,500,279 discloses a hot manifold system employing heat pipes adjacent runner channels to provide continuous heating of the runners during injection molding. Such injection molding apparatus require heat pipes to transfer sufficient heat energy to maintain the high temperatures, often 400°–500° F., necessary to keep the mold material fluid so that a fixed amount of molding material can be transferred in its molten state to completely fill the mold cavity.

On the other hand, foam pattern molds do not require the high temperatures required for injection molding. Moreover, the foam material is transferred without reaching a molten state. Rather, the expandable foam pellets are heated to increase the volume of the pellets within the confined space of the mold chamber. As a result, the time during which heat is supplied rather than the ability to maintain high temperatures is required in foam pattern making.

Furthermore, injection molded parts can be removed from the mold whenever the molding material solidifies. Once injection material has filled the mold cavity, the application of heat is terminated. The material solidifies once the heat energy is no longer input to maintain the molten state of the material. As a result, previously known injection molding apparatus do not address the problem of maintaining consistent temperature variation throughout all parts of the mold during the curing process as is required in the cooling phase of making expanded foam patterns.

From the foregoing, the skilled artisan will appreciate that the teachings of the previously known injection molding apparatus are not readily applicable to expanded foam pattern making processes.

TECHNICAL PROBLEM RESOLVED

The present invention overcomes the abovementioned disadvantages by providing a method for preparing mold parts for expanded foam pattern making and the method of preparing molded expandable foam parts. The method controls the application of heat to mold walls defining the mold cavity by assuring that heat transfer, preferably during both heating and cooling of expandable foam is more uniform throughout the mold cavity.

In general, the methods are practiced with mold parts having mold walls defining a mold cavity. The mold walls are separated from housing walls of the mold parts to define a heat exchange cavity opposite the mold wall surface defining the mold cavity. In accordance with the present invention, at least one heat pipe is placed adjacent at least one selected portion of the mold wall.

Preferably, the heat pipes are inserted in recesses adjacent to contiguous wall portions and the heat pipe is longer than the recess size to extend outwardly into the heat exchange cavity. In the preferred embodiment, assembly of the mold parts enables the mold walls of the mold parts to form an enclosed mold cavity in the shape of a selected part. Each of the mold parts is preferably made of aluminum to take advantage of its heat transfer properties, although it will be appreciated that other materials will also be considered desirable for this reason and are also within the scope of the present invention. In addition, each of the tools includes heat exchange inlets and outlets coupled to the heat exchange chamber defined between the mold wall and the housing wall of the tool. Moreover, assembly of the mold parts places the heat exchange cavity in each part in fluid communication with at least one adjacent heat exchange cavity of an adjacent mold part.

Foam molded parts constructed according to the present invention have greater dimensional stability than previously known expanded foam parts. In addition, the molded patterns have more uniform surface quality and substantially improve the ratio of quality parts to parts which must be rejected due to defects. The expansion of the beads of foam materials is more consistent throughout the entire pattern. Furthermore, the process avoids the problem of collapsing foam which can occur due to overheating when differences in the thickness and thinness of the pattern being molded cause extended but inconsistent heating of the expanding foam.

In addition, the method of the present invention minimizes the time required to mold each pattern. A further advantage is that the weight of the part to be produced by the evaporative casting process utilizing the pattern can be substantially reduced by permitting reshaping of the pattern. In particular, reconfiguration of the pattern to reduce finish part mass in areas where it is not needed may be provided by redesigning the mold wall with projections of increased wall thickness since the use of heat pipes can improve surface temperature consistency throughout the mold cavity by appropriate selection and placement.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which.

DESCRIPTION OF THE BEST MODE

Figure 1:
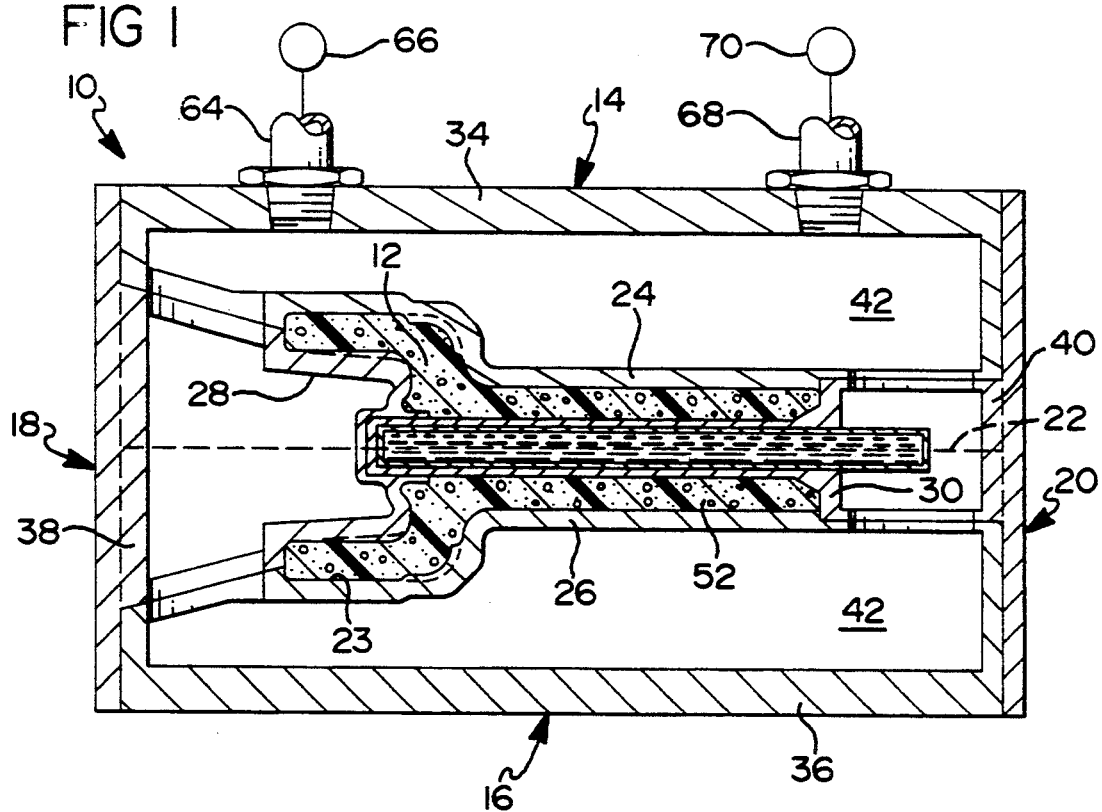
FIG. 1 is an elevation, sectional view of a mold assembly constructed in accordance with the present invention.
Figure 2:
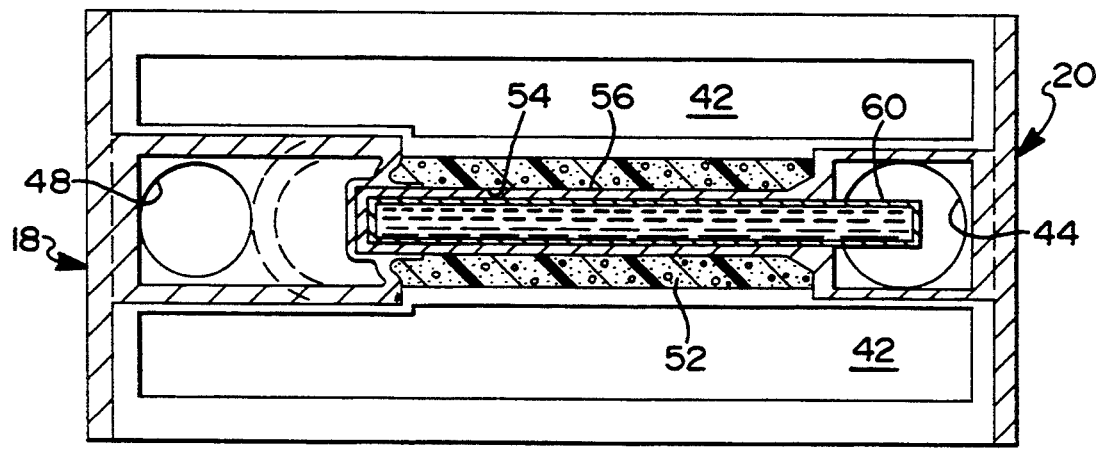
FIG. 2 is a plan sectional view of the mold assembly shown in FIG. 1.

As shown in FIGS. 1 and 2, a mold assembly or tool 10 for practicing the present invention is shown comprising a plurality of mold parts 14, 16, 18 and 20. Parts 14 and 16 are separated at a split line 22 and are adapted to receive the end mold parts 18 and 20 so as to enclosed a mold chamber 23 in which the foam pattern 12 is to be made.

Each mold part includes a mold wall defining a part of the mold cavity 23 as shown at 24, 26, 28 and 30 in FIG. 1. In addition, each mold part includes at least one housing wall such as the walls 34, 36, 38 and 40 shown in FIG. 1. The housing wall of each mold part is spaced apart from the mold wall portions so as to define a heat exchange cavity 42 between the walls. Appropriate passageways such as the registering apertures 44 in overlapping housing wall portions as shown in FIG. 2 permit the cavities 42 in each of the mold parts to communicate with each other when the tool is assembled as shown in the drawing. The mold parts have mold walls particularly configured to form a mold cavity 23 matching the shape of the desired foam pattern 12. It will be understood that the shape and dimensions of the pattern mold cavity 23 matches the desired specifications for the part to be made from the evaporative casting process in which the pattern 12 is used.

In the preferred embodiment, the pattern 12 to be formed is a yoke pattern. The yoke, later to be formed by evaporative casting, includes an elongated, hollow cylindrical portion as represented by the elongated cylindrical portion 52 of pattern 12 shown in FIGS. 1 and 2. An elongated recess 54 in the cylindrical portion 52 is formed by an elongated recessed portion 56 of the mold wall 30. While the mold wall surface of the mold wall portion 56 which faces the mold cavity 23 is configured in accordance with the specifications of the desired shape of the yoke 12, the opposite mold wall surface may be particularly configured to receive a heat pipe 60.

The heat pipe 60 may be a known type of thermoset heat transfer conductor such as the commercially available isobars of Acrolabs Instruments, Ltd. Preferably, the heat pipe 60 is substantially longer than the recess in the mold wall portion 56 so that a portion of the heat pipe 60 extends outwardly into the chamber 42 of the mold part 20. As a result, the heat exchange fluid medium, preferably steam, is delivered to the heat exchange cavity 42 through one or more inlets 64 (one shown in FIG. 1) in one or more of the mold parts. The steam will fill the communicating cavities 42 in the mold parts, and surround a portion of heat pipe 60 so that heat energy in the fluid medium can be quickly transferred through the heat pipe to the mold wall portion 56 forming the central cavity 54 of the yoke pattern 12. Similarly, a fluid medium such as a coolant, for example cold water, delivered to the chamber 42 from a source 70 through fluid coupling 68, likewise fills the chamber 42 and contacts the heat pipe 60 to remove heat energy from the mold wall portion 56.

Having thus described the important structural features required to practice the present invention, the method for making patterns and preparing mold parts for the pattern making process is readily described. At least one of the mold parts is then prepared by inserting a heat pipe adjacent at least one mold wall portion, and is positioned in communication with the heat exchange cavity of the mold part. Furthermore, when the heat pipe 60 is inserted in a recessed mold wall portion such as the recess in mold wall portion 56, the heat pipe 60 is preferably longer than the recess so that a portion of the heat pipe 60 extends outwardly into the heat exchange cavity 42 of the mold part.

When the mold parts are joined, a plurality of expandable foam beads are introduced into the mold cavity 23. For example, expandable grains such as T size polystyrene grains available from Arco Polymer and having an initial density of about 1.25–1.35 lb/ft$^3$ are blown into the mold cavity 23. When the beads are introduced to the mold cavity 42, a large portion of the area in the cavity includes interspaces between the beads. A fluid heat exchange medium, such as steam, is then introduced into the heat exchange cavities 42 of the mold parts to increase the temperature of the tool. The introduction of heat throughout the tool raises the temperature of the tool 12 in the range of 210°–220° F. and causes the beads to expand against each other and against the mold wall surfaces of the tool.

During the molding process, the temperature of the heat exchange fluid uniformly heats the mold wall portions of the mold so that consistent expansion of the beads occurs throughout the mold cavity. The heat is applied for a predetermined time so that the expanded beads form a continuous and consistent surface in engagement with the mold wall surfaces of the tool. In an example according to the preferred embodiment, the superheated steam was pumped through the heat exchange cavity for about 2 seconds before flow was terminated so that autoclaving permits fusion over a controlled time period of about 5 seconds. The heated fluid is then removed from the heat exchange cavity, preferably by replacing it with a cooling fluid for about 2.3 seconds, to uniformly discontinue additional expansion of the beads throughout the mold cavity. The coolant was then purged in about 2 seconds and the mold was left in a vacuum state for about 10 seconds. The mold parts can then be separated to remove the completed pattern from the tool.

In a particular example of the casting process, a yoke pattern 12 formed in accordance with the present invention showed substantial improvement in the quality of the resulting patterns over patterns formed from the previously known processes. In particular, a set of 60 yoke patterns formed by the process of the present invention under the conditions described above were compared with 60 patterns formed from mold parts using a hollow vented core to provide communication between the heat exchange cavity and the mold cavity prior to introduction of the expandable foam beads. Another set of 60 pieces were also made by similar aluminum tools in which the core defining the central cavity 54 was hollow to receive the heat exchange fluid. The mold tools for each set were subjected to heat exchange temperatures at substantially the same pressures and temperatures to determine the effectiveness of the process. The resulting parts were then inspected and rated as shown in the following chart.

|  | STEM | | | | | SCUFF | | | EARS | | | | | C.T. |
| --- | --- | --- | --- | --- | --- | --- | --- | --- | --- | --- | --- | --- | --- | --- |
|  | 5 | 4 | 3 | 2 | 1 | 3 | 2 | 1 | 5 | 4 | 3 | 2 | 1 |  |
| Hollow Vented Core | 0 | 25 | 9 | 20 | 6 | 0 | 22 | 38 | 0 | 0 | 6 | 35 | 4 | 38 Secs |
|  | | Avg: 2.9 | | | | Avg: 1.3 | | | Avg: 1.5 | | | | | |
| Hollow Core (No vents) | 3 | 20 | 28 | 6 | 3 | 3 | 52 | 5 | 0 | 6 | 33 | 20 | 0 | 51 Secs |
|  | | Avg: 3.2 | | | | Avg: 2.0 | | | Avg: 2.8 | | | | | |
| Heat Pipe in Core | 37 | 37 | 6 | 0 | 0 | 80 | 0 | 0 | 2 | 25 | 44 | 8 | 1 | 35 Secs |
|  | | Avg: 4.1 | | | | Avg: 3.0 | | | Avg: 3.25 | | | | | |
|  | | Max = 5.0 | | | | Max = 3.0 | | | Max = 5.0 | | | | | |

The STEM category refers to the degree of bead fusion on the outer surface of the cylindrical yoke portion. The SCUFF column refers to the inner diameter surface of the cylindrical portion of the yoke. The EARS column refers to the exterior surface of the spaced ears. The C.T. column identifies the total cycle time required to operate the mold for each pattern produced.

As can be seen, a substantially greater number of useful parts were provided by the method of the present invention. According to the rating system used, the parts receiving ratings of 1 or 2 under the STEM and EAR categories may be deemed defective as unable to produce quality parts in an evaporative casting process. Patterns receiving a rating of 1 under the SCUFF category are also considered to be of unusable quality. As is evident from the chart, substantially less of the parts produced in the pattern making method of the present invention were rejected as defective. Moreover, the single heat pipe used in the cylindrical portion 50 of the part 12 provided more uniform heating throughout the mold cavity including the ears of the yoke as demonstrated by the improved results of column 3. The improved surface finish and consistency of the parts resulting from the uniform heating process of the present invention renders the present invention a substantially more efficient production technique than previously known foam pattern making processes.

Having thus described the present invention, many modifications to the method may become evident to persons of ordinary skill in the art without departing from the scope and spirit of the present invention as defined in the appended claims.

We claim:

1. A method for making patterns used in evaporative casting comprising:
   selecting a plurality of mold parts, each mold part having at least one mold wall configured to shape a surface portion of said pattern and at least one mold housing wall spaced from said at least one mold wall to form heat exchange cavities between at least one said mold wall and said housing wall;
   inserting a heat pipe closed to fluid communication with the heat exchange cavity in at least one said mold part adjacent at least one mold wall portion and in communication with said heat exchange cavity;
   joining said mold parts so that said mold walls confine a part forming space and said housing walls confine said heat exchange cavities of each mold part in fluid communication with said heat exchange cavities of an adjacent mold part;
   introducing heat expandable foam making material into said part forming space;
   introducing a heated fluid heat exchange medium into said heat exchange cavities;
   removing said heated fluid medium from said cavity after a predetermined time; and
   separating said plurality of mold parts to release said pattern.

2. The method as defined in claim 1 wherein said adjacent mold wall portion is recessed a distance from contiguous mold wall surfaces forming said heat exchange cavity; and
   wherein said inserting step comprises inserting a heat pipe longer than said distance, whereby said heat pipe protrudes into said heat exchange cavity.

3. The method as in claim 1 wherein said inserting step comprises inserting said heat pipe in a mold part having an elongated chamber dimensioned to receive at least a portion of said heat pipe.

4. The method of claim 1 and further comprising the step of introducing a cooled fluid heat exchange medium into heat exchange cavities after said introducing a heated fluid medium step.

5. A method for preparing mold parts to make an expanded foam pattern, used in evaporative casting, by heating expandable foam beads at temperatures in the range of 200° to 220° F., comprising:
   selecting a plurality of mold parts, each mold part having at least one mold wall configured to shape a surface portion of said pattern and at least one mold housing wall spaced from said at least one mold wall to form heat exchange cavities between at least one said mold wall and said housing wall;
   inserting a heat pipe closed to fluid communication with the heat exchange cavities in at least one said mold part adjacent at least one mold wall portion and in communication with said heat exchange cavity; and
   joining said mold parts so that said mold walls confine a part forming space and said housing walls confine said heat exchange cavities of each mold part in fluid communication with said heat exchange cavities of an adjacent mold part.

6. The method as defined in claim 5 further comprising the step of selecting at least one mold wall portion of at least one mold part recessed at least a predetermined distance from contiguous mold wall portions defining said heat exchange cavity and inserting said heat pipe in said recessed mold wall portion.

7. The method as defined in claim 6 and further comprising selecting a heat pipe having a length longer than said predetermined distance.

8. The method as defined in claim 5 and further comprising selecting at least one mold wall portion spaced at least a predetermined distance from an opposing mold wall portion across said part forming space, and inserting at least one heat pipe adjacent said at least one mold wall portion.

* * * * *